United States Patent
Kolesinski et al.

(10) Patent No.: US 11,500,711 B1
(45) Date of Patent: Nov. 15, 2022

(54) SYSTEM AND METHOD FOR DETERMINING ERROR OCCURRENCE IN GRAPHICS MEMORY OF GRAPHICS PROCESSING UNIT

(71) Applicant: Rockwell Collins, Inc., Cedar Rapids, IA (US)

(72) Inventors: Marcin Kolesinski, Central City, IA (US); Victor Ashby, Draper, UT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 8 days.

(21) Appl. No.: 17/380,336

(22) Filed: Jul. 20, 2021

(51) Int. Cl.
*G06F 11/07* (2006.01)
*G06T 1/60* (2006.01)
*G06F 11/10* (2006.01)
*G06T 1/20* (2006.01)

(52) U.S. Cl.
CPC ........ *G06F 11/0772* (2013.01); *G06F 11/073* (2013.01); *G06F 11/0706* (2013.01); *G06F 11/0721* (2013.01); *G06F 11/0751* (2013.01); *G06F 11/1004* (2013.01); *G06T 1/20* (2013.01); *G06T 1/60* (2013.01)

(58) Field of Classification Search
CPC ............. G06F 11/0706; G06F 11/0721; G06F 11/073; G06F 11/0751; G06F 11/0772; G06F 11/1004
USPC .............................................. 714/37, 21, 44
See application file for complete search history.

(56) References Cited

U.S. PATENT DOCUMENTS

| | | |
|---|---|---|
| 5,408,650 A | 4/1995 | Arsenault |
| 8,780,114 B1 | 7/2014 | Jackey et al. |
| 9,665,233 B2 | 5/2017 | Rosen et al. |
| 9,773,334 B1 | 9/2017 | Walker et al. |
| 9,836,354 B1 | 12/2017 | Potlapally et al. |
| 10,073,732 B2 | 9/2018 | Lee et al. |
| 10,146,661 B2 | 12/2018 | Delwood et al. |
| 10,467,774 B2 | 11/2019 | Gruber et al. |
| 10,725,861 B2 | 7/2020 | Bolotov et al. |
| 11,024,402 B2 | 6/2021 | Chung |

(Continued)

FOREIGN PATENT DOCUMENTS

| | | |
|---|---|---|
| CN | 107480035 A | 12/2017 |
| CN | 111480195 A | 7/2020 |

(Continued)

*Primary Examiner* — Chae M Ko
(74) *Attorney, Agent, or Firm* — Suiter Swantz pc llo (57) ABSTRACT

A system may include a graphics processing unit (GPU) and a processor. The GPU may include a GPU core and non-error-detection-and-correction (non-EDAC) graphics memory. The graphics memory may contain a data object and a copy of the data object. The processor may be configured to: instruct the GPU to handle the data object and the copy of the data object as textures; and instruct the GPU to execute a texture comparison shader program. The GPU core may be configured to: execute the texture comparison shader program; compare the data object and the copy of the data object; generate comparison results; and output the comparison results as pixels to an off-screen area of a framebuffer. The processor may further be configured to: obtain (a) a hash value of the off-screen area, or (b) the off-screen area; and determine whether the comparison results are at least one expected value.

15 Claims, 5 Drawing Sheets

(56) References Cited

U.S. PATENT DOCUMENTS

| | | | |
|---|---|---|---|
| 2008/0301717 A1 | 12/2008 | Chilimbi et al. | |
| 2015/0029202 A1 | 1/2015 | Yanagida | |
| 2015/0070380 A1* | 3/2015 | Lum | G06T 11/40 345/612 |
| 2015/0103087 A1* | 4/2015 | Rouet | G06T 15/80 345/589 |
| 2019/0235953 A1* | 8/2019 | Kalamatianos | G06F 11/1064 |
| 2021/0026533 A1 | 1/2021 | Vu | |
| 2021/0117269 A1 | 4/2021 | Kalamatianos et al. | |
| 2021/0149569 A1 | 5/2021 | Prosser et al. | |

FOREIGN PATENT DOCUMENTS

| | | |
|---|---|---|
| EP | 0969375 B1 | 4/2007 |
| WO | 2021045978 | 3/2021 |

\* cited by examiner

SYSTEM AND METHOD FOR DETERMINING ERROR OCCURRENCE IN GRAPHICS MEMORY OF GRAPHICS PROCESSING UNIT

BACKGROUND

Typical three-dimensional (3D) graphics processing units (GPUs) typically have large amounts of graphics memory (e.g., video random access memory (VRAM)); however, such graphics memory is typically not error detection and correction (EDAC) graphics memory (e.g., error correction code (ECC) graphics memory). Such non-EDAC graphics memory can be vulnerable to various sources of corruption, such as neutron single event upsets (NSEUs).

GPUs often store critical data in non-EDAC graphics memory. For example, critical data may include a graphics address remapping table (GART) (e.g., which may function like a memory management unit (MMU)), vertex data (e.g., associated with vertex coordinates, attributes, and/or indices), texture data, pixel data, and/or shader programs (which may be referred to, throughout, simply as "shaders"). For example, the size of a GART can grow proportionally to the ever-increasing size of the graphics memory.

Some existing methods of mitigating non-EDAC graphics memory's vulnerability to corruption significantly exceed bandwidth limitations of many applications. For example, existing methods of mitigating non-EDAC graphics memory's vulnerability to corruption for a GART for an AMD E9171 GPU may require approximately 700 rendered frames before detecting an error and latching a fault. At 700 rendered frames, such detection time would take greater than 30 seconds, when some aviation applications sometimes require error detection within 2 seconds. Other existing methods of mitigating non-EDAC graphics memory's vulnerability to corruption may involve refreshing critical data. However, such refreshing may be bandwidth intensive for the central processing unit (CPU) and/or Peripheral Component Interconnect (PCI) (e.g., PCI Express (PCIe)) bus, and/or may not actually detect that an error in the non-EDAC graphics memory occurred. Further, undetected prior occurrence of errors can have lasting side effects.

SUMMARY

In one aspect, embodiments of the inventive concepts disclosed herein are directed to a system. The system may include a graphics processing unit (GPU). The GPU may include at least one GPU core and non-error-detection-and-correction (non-EDAC) graphics memory. The non-EDAC graphics memory may contain a data object and a copy of the data object. The system may further include at least one processor communicatively coupled to the GPU. The at least one processor may be configured to: instruct the GPU to handle the data object and the copy of the data object as textures; and instruct the GPU to execute a texture comparison shader program. The at least one GPU core may be configured to: execute the texture comparison shader program for comparing the data object and the copy of the data object; compare the data object and the copy of the data object; generate comparison results indicative of a comparison of the data object and the copy of the data object; and output the comparison results as pixels to an off-screen area of a framebuffer of the non-EDAC graphics memory. The at least one processor may further be configured to: obtain at least one of (a) a hash value of the off-screen area of the framebuffer including the pixels corresponding to the comparison results, or (b) the off-screen area of the framebuffer including the pixels corresponding to the comparison results; and determine whether the comparison results are at least one expected value by determining whether (a) the hash value is an expected hash value or (b) all of the pixels are expected colors, wherein an error in the non-EDAC graphics memory has occurred when (a) the hash value is not the expected hash value or (b) one or more of the pixels are not the expected colors.

In a further aspect, embodiments of the inventive concepts disclosed herein are directed to a method. The method may include: instructing, by at least one processor, a graphics processing unit (GPU) to handle a data object and a copy of the data object as textures, the GPU comprising at least one GPU core and non-error-detection-and-correction (non-EDAC) graphics memory, the non-EDAC graphics memory containing the data object and the copy of the data object, the at least one processor communicatively coupled to the GPU; instructing, by the at least one processor, the GPU to execute a texture comparison shader program; executing, by the at least one GPU core, the texture comparison shader program for comparing the data object and the copy of the data object; comparing, by the at least one GPU core, the data object and the copy of the data object; generating, by the at least one GPU core, comparison results indicative of a comparison of the data object and the copy of the data object; outputting, by the at least one GPU core, the comparison results as pixels to an off-screen area of a framebuffer of the non-EDAC graphics memory; obtaining, by the at least one processor, at least one of (a) a hash value of the off-screen area of the framebuffer including the pixels corresponding to the comparison results, or (b) the off-screen area of the framebuffer including the pixels corresponding to the comparison results; and determining, by the at least one processor, whether the comparison results are at least one expected value by determining whether (a) the hash value is an expected hash value or (b) all of the pixels are expected colors, wherein an error in the non-EDAC graphics memory has occurred when (a) the hash value is not the expected hash value or (b) one or more of the pixels are not the expected colors.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to determine whether an error in graphics memory of a GPU has occurred.

Some embodiments, may improve the functioning of a computing system and/or a GPU, itself, by mitigating non-EDAC graphics memory vulnerabilities, improving error detection, and/or reducing interconnect bandwidth usage.

Normally, graphics memory of a GPU is inaccessible to hardware (e.g., CPUs) outside of the GPU. Some embodiments may include exposing such normally inaccessible graphics memory for reading via an application programming interface (API), which may allow the graphics memory to be sampled by shaders executing in the GPU, as if various data (e.g., such as non-texture data and/or texture data) in the graphics memory were texture data. For example, GPU shader programs, which may have extremely high bandwidth access to the graphics memory, can hash or compare copies of the data to achieve run-time validation of the graphics memory contents. Shader program(s) can output hash values (e.g., cyclic redundancy check (CRC) values) or compare results as pixel values, such as into an off-screen area of a frame buffer of the graphics memory, where the hash values or pixel values may be included with the video stream sent to an external device (e.g., a processor and/or a video processor), which can then compare the hash values or pixel values to expected results. For example, in some embodiments, a GART can be completely validated in very few passes (e.g., as few as 2 passes for a GPU used in a combined vision system (CVS); as compared to existing techniques which can take greater than 700 passes to completely validate a GART).

In typical graphical APIs, graphics memory (or VRAM) may be confined and disallows direct access by external devices. Applications executed on external devices may provide binary data for an assortment of objects, such as shaders, textures, and vertex buffer objects. This binary data may be parsed and/or copied as needed by the GPU API that the application is using and placed in VRAM. Typically, the application may not know how this is done and cannot validate that the copy occurred correctly. In some embodiments, a 3D graphics API, such as OPENGL, may be used to give the application indirect access to locations in the graphics memory as textures, or as places to read/write to in small chunks. Such indirect access may provide typical operations on the usually hidden graphics memory, giving the application the ability to write a shader program to graphics memory to examine the graphics memory directly. Once the application has access to object data stored in VRAM, the application would need to interact with the object data in a useful way. Texturing, as a technique, works on texture elements ("texels"; sometimes referred to as texture pixels; a fundamental unit of a texture map). Texturing can pull a texel from VRAM into the shader. This can be used to output as color. However, doing this in confined image space (e.g. the off-screen area of a frame buffer) makes this problem more difficult, as the object will not inherently conform to the confined image space. In some embodiments, shaders may be used, which know where in the confined image space the color will be placed, and may read the memory. For example, the shader can consolidate and/or collapse the data (e.g., compare multiple input texels and/or produce a single output pixel/texel), which can be verified downstream via a CRC check, giving a byte-for-byte accurate output while removing significant CPU costs, and moving the costs to a mostly idle GPU.

In some embodiments, shader output may also provide a mapping (which can be visualized) of which memory segment(s) have been corrupted.

As used throughout, pseudo-textures may refer to texture data and/or non-texture data in graphics memory, which can be visualized through a computer graphics technique known as "texturing", wherein the GPU will treat the texture data and/or non-texture data as if such data were texture data.

As used throughout, texturing may refer to a rectangular block of graphics memory in which the GPU can read data from, often with interpolation applied.

As used throughout, a shader may be a program executed by a GPU, normally used for shading in 3D scenes.

Referring now to FIGS. 1A-3, an exemplary embodiment of a system 100 (e.g., system 100A and/or system 100B) according to the inventive concepts disclosed herein is depicted. In some embodiments, the system 100 may include a vehicle (e.g., an aircraft 102), which may include at least one computing system (e.g., combined vision system (CVS) 104). While exemplary embodiments are shown and described as including a vehicle (e.g., the aircraft 102), some embodiments may omit a vehicle. While exemplary embodiments are shown and described as including a CVS 104, some embodiments may use any suitable computing system.

Figure 1A:
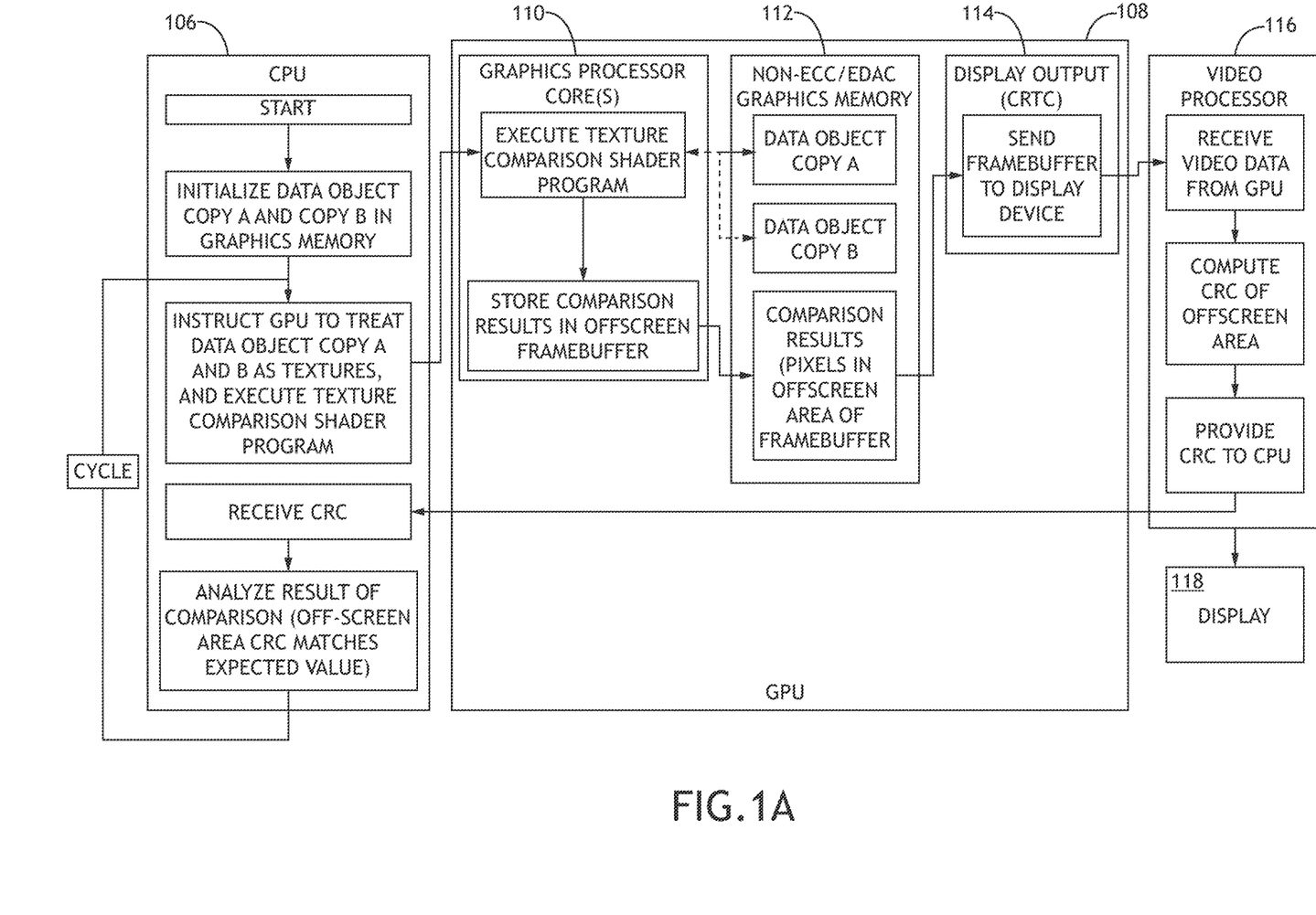
FIG. 1A is a view of an exemplary embodiment of a system including a processor and a GPU according to the inventive concepts disclosed herein.
Figure 1B:
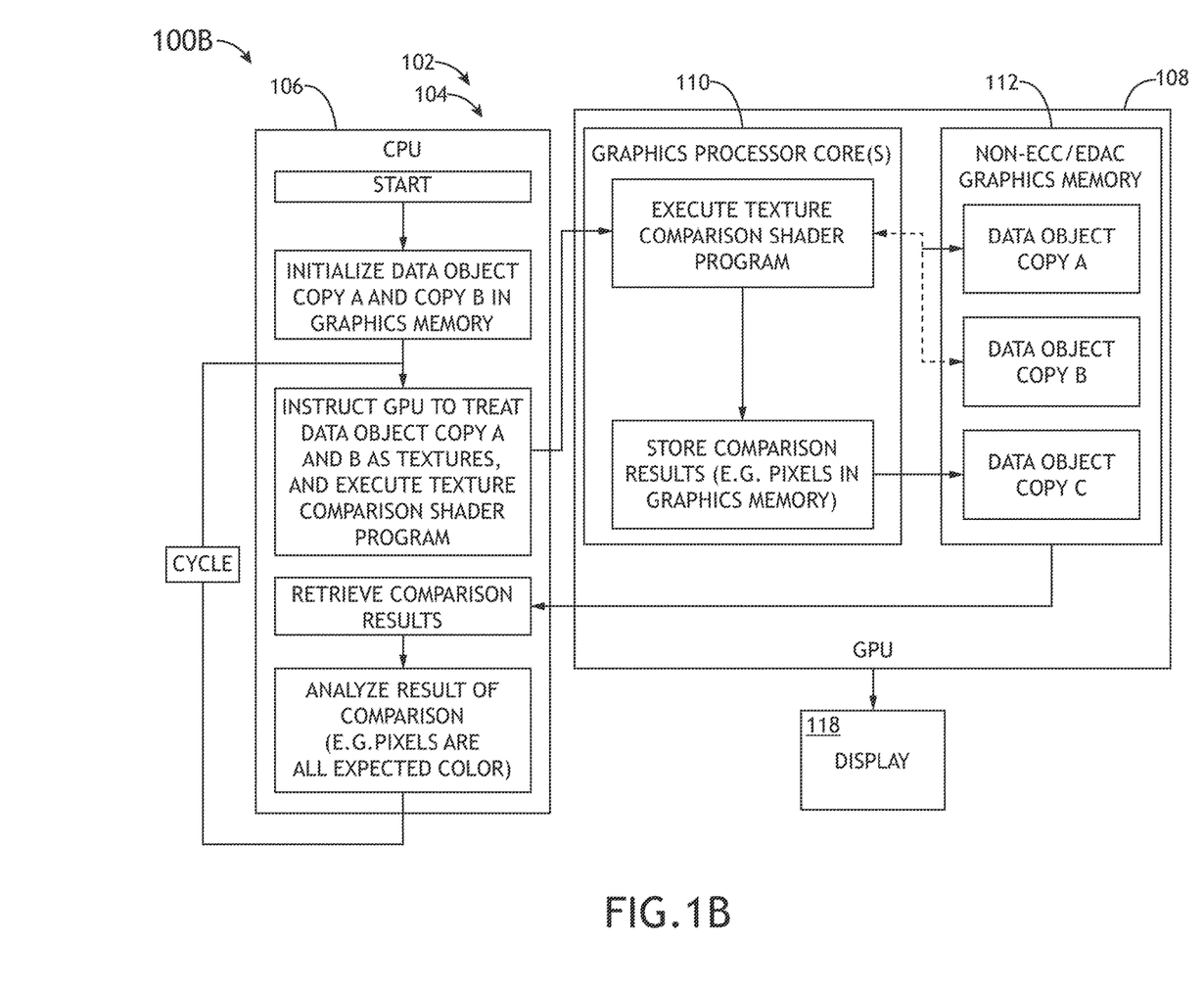
FIG. 1B is a view of a further exemplary embodiment of a system including a processor and a GPU according to the inventive concepts disclosed herein.

For example, as shown FIGS. 1A and 1B, the computing system (e.g., CVS 104) may include at least one processor (e.g., at least one CPU 106), at least one GPU 108, at least one video processor 116, and/or at least one display 118, some or all of which may be communicatively coupled at any given time. For example, where the computing system is the CVS 104, at least one of the GPU 108 and/or the at least one processor (e.g., CPU 106) may be configured to: combine synthetic images of an environment of the aircraft 102 and sensor images of the environment of the aircraft 102; and/or output merged synthetic and sensor images of the environment of the aircraft 102 to a display for presentation to a user (e.g., a pilot). An exemplary CVS is disclosed in U.S. Pat. No. 9,773,334, filed Sep. 2, 2014 and issued Sep. 26, 2017, titled HIGH PERFORMANCE, LOW LATENCY COMBINED VISION SYSTEM FOR USE IN DEGRADED VISUAL ENVIRONMENTS, which is hereby incorporated by reference in its entirety.

For example, the at least one processor may be at least one CPU 106, at least one field-programmable gate array (FPGA), and/or at least one application specific integrated circuit (ASIC). For example, the at least one processor may be configured to perform (e.g., collectively perform if more than one processor) any of the operations disclosed throughout.

Figure 2:
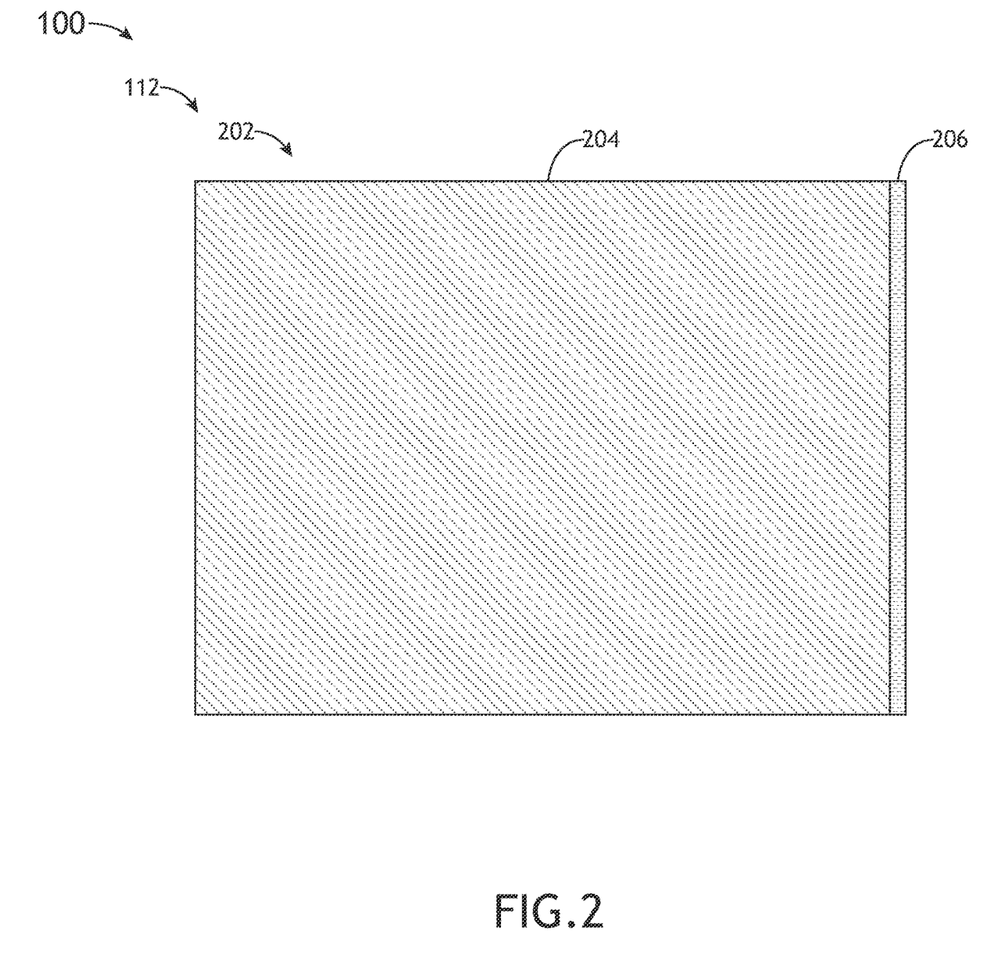
FIGS. 2 and 3 are exemplary views of an exemplary embodiment of a frame buffer of non-EDAC graphics memory of the GPU of FIGS. 1A and 1B according to the inventive concepts disclosed herein.
Figure 3:
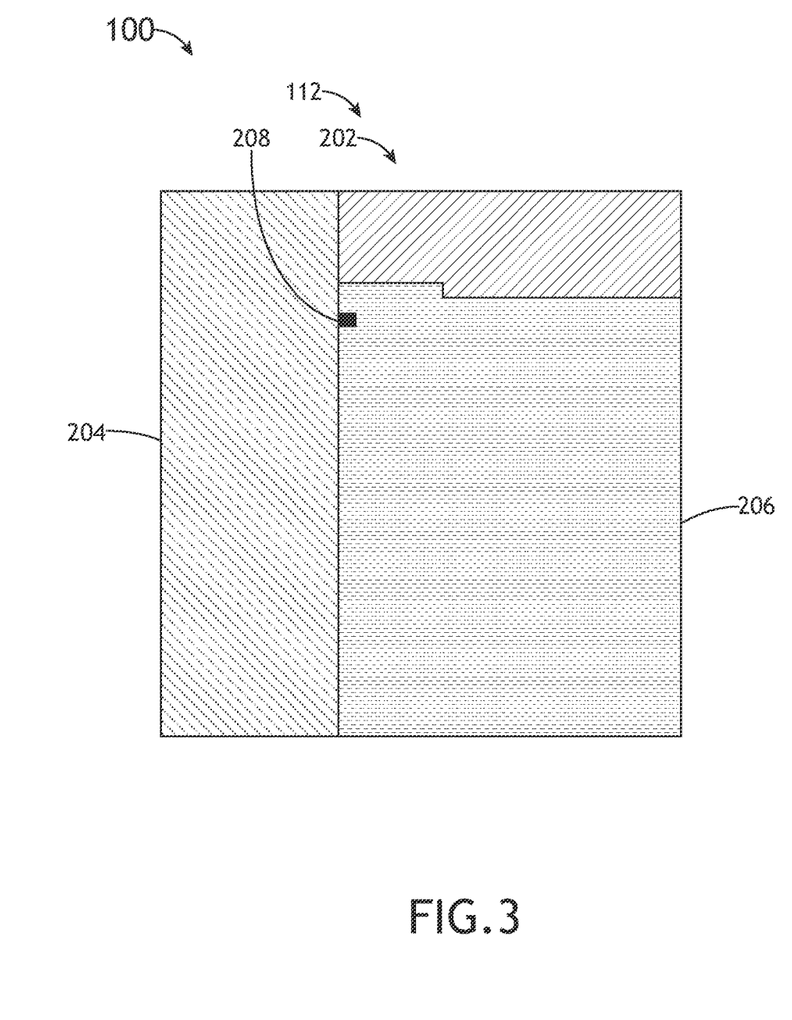

For example, the GPU 108 may include at least one GPU core 110, graphics memory (e.g., non-EDAC graphics memory 112 (e.g., non-ECC graphics memory)), and/or at least one display output 114 (e.g., a cathode ray tube controller (CRTC)), some or all of which may be communicatively coupled at any given time. For example, the non-EDAC graphics memory 112 may include at least one frame buffer 202, as shown in FIGS. 2-3. The non-EDAC graphics memory 112 may contain a data object and a copy of the data object; in some embodiments, the "data object" may also be a copy of an original data object. For example, the at least one GPU 108 may be configured to perform (e.g., collectively perform if more than one GPU 108) any of the operations disclosed throughout. For example, the at least one GPU core 110 may be configured to perform (e.g., collectively perform if more than one GPU core 110) any of the operations disclosed throughout.

For example, the at least one video processor 116 may be configured to perform (e.g., collectively perform if more than one video processor 116) any of the operations disclosed throughout.

In some embodiments, referring generally to FIGS. 1A-3, at least one processor (e.g., CPU 106) may be configured to: instruct the GPU 108 to handle the data object and the copy of the data object as textures; and/or instruct the GPU 108 to execute a texture comparison shader program. At least one GPU core 108 may be configured to: execute the texture comparison shader program for comparing the data object and the copy of the data object; compare the data object and the copy of the data object; generate comparison results indicative of a comparison of the data object and the copy of the data object; and/or output the comparison results as pixels to an off-screen area 206 of a framebuffer 202 of the non-EDAC graphics memory 112. The at least one processor (e.g., CPU 106) may be configured to: obtain at least one of (a) a hash value of the off-screen area 206 of the framebuffer 202 including the pixels corresponding to the comparison results, or (b) the off-screen area 206 of the framebuffer 202 including the pixels corresponding to the comparison results; determine whether the comparison results are at least one expected value by determining whether (a) the hash value is an expected hash value or (b) all of the pixels are expected colors, wherein an error in the non-EDAC graphics memory 112 has occurred when (a) the hash value is not the expected hash value or (b) one or more of the pixels are not the expected colors; and/or upon a determination that the error in the non-EDAC graphics memory has occurred, latch a fault.

In some embodiments, the data object may be any suitable data object. For example, the data object may be or may include texture data and/or non-texture data. For example, the data object may be or may include a graphics address remapping table (GART), texture data, vertex data, and/or another shader program. For example, the data object may be predetermined to be relatively more critical than other data contained in the non-EDAC graphics memory 112, and the at least one GPU core 110 may not generate any comparison results corresponding to the less critical other data.

In some embodiments, the hash value is a cyclic redundancy check (CRC) value and the expected hash value is an expected CRC value.

In some embodiments, execution of the texture comparison shader program may cause repeated (e.g., cyclically repeated) comparing of the data object and the copy of the data object. In some embodiments, the at least one processor (e.g., CPU 106) may be configured to: instruct the GPU 108 to handle a second data object and a copy of the second data object as second textures; and/or instruct the GPU 108 to execute the texture comparison shader program for comparing the second data object and the copy of the second data object, wherein execution of the texture comparison shader program causes repeated (a) comparing of the data object and the copy of the data object and (b) comparing of the second data object and the copy of the second data object.

Referring to FIG. 1A, some embodiments may include a CPU 106, a GPU 108, a video processor 116, and/or a display 118. For example, the CPU 106 may be configured to: initialize a data object (e.g., data object copy A) and a copy of the data object (e.g., data object copy B) in the non-EDAC graphics memory 112; instruct the GPU 108 to handle the data object and the copy of the data object as textures; and/or instruct the GPU 108 to execute a texture comparison shader program. The at least one GPU core 110 may be configured to: execute the texture comparison shader program for comparing the data object and the copy of the data object; compare the data object and the copy of the data object; generate comparison results indicative of a comparison of the data object and the copy of the data object; and/or output the comparison results as pixels to the off-screen area 206 of the framebuffer 202 (e.g., of the non-EDAC graphics memory 112), for example, such that the comparison results are stored in the off-screen area 206 of the frame buffer 202. The display output 114 (e.g., the CRTC) may be configured to output the framebuffer 202 including the off-screen area 206 of the framebuffer 202 to the video processor 116. The video processor 116 may be configured to: receive the framebuffer 202 including the off-screen area 206 of the framebuffer 202; compute a hash value (e.g., a CRC value) of the off-screen area 206 of the framebuffer 202; and/or output the hash value to the CPU 106. The CPU 106 may be further configured to: obtain the hash value of the off-screen area 206 of the framebuffer 202 including the pixels corresponding to the comparison results; and/or determine whether the comparison results are at least one expected value by determining whether the hash value (e.g., the CRC value) is an expected hash value (e.g., an expected CRC value), wherein an error in the non-EDAC graphics memory has occurred when the hash value is not the expected hash value.

Referring to FIG. 1B, some embodiments may include a CPU 106, a GPU 108, and/or a display 118. For example, the CPU 106 may be configured to: initialize a data object (e.g., data object copy A) and a copy of the data object (e.g., data object copy B) in the non-EDAC graphics memory 112; instruct the GPU 108 to handle the data object and the copy of the data object as textures; and/or instruct the GPU 108 to execute a texture comparison shader program. At least one GPU core 108 may be configured to: execute the texture comparison shader program for comparing the data object and the copy of the data object; compare the data object and the copy of the data object; generate comparison results indicative of a comparison of the data object and the copy of the data object; and/or output the comparison results as pixels to an off-screen area 206 of a framebuffer 202 of the non-EDAC graphics memory 112. The CPU 106 may be further configured to: obtain the off-screen area 206 of the framebuffer 202 including the pixels corresponding to the comparison results; and/or determine whether the comparison results are at least one expected value by determining whether all of the pixels are expected colors, wherein an error in the non-EDAC graphics memory 112 has occurred when one or more of the pixels are not the expected colors.

Referring to FIGS. 2-3, in some embodiments, the non-EDAC graphics memory 112 may include at least one frame buffer 202. As shown in FIG. 2, the frame buffer 202 may include an on-screen area 204 for normal to-be-displayed 3D graphics and an off-screen area 206, which may typically not be displayed. Typically, the off-screen area 206 is much smaller than the on-screen area 204. As shown in FIG. 3, a magnified view of a portion of the frame buffer 202 is shown. The off-screen area 206 of the frame buffer may provide a mapping (which can be visualized) of which memory segment(s) of a data object (e.g., a GART) have been corrupted. For example, as shown in FIG. 3, the memory segment 208 of the data object (e.g., the GART) has been determined to be corrupted, which is indicative of an error; whereas, other memory segments adjacent to the corrupted memory segment 208 were validated.

Figure 4:
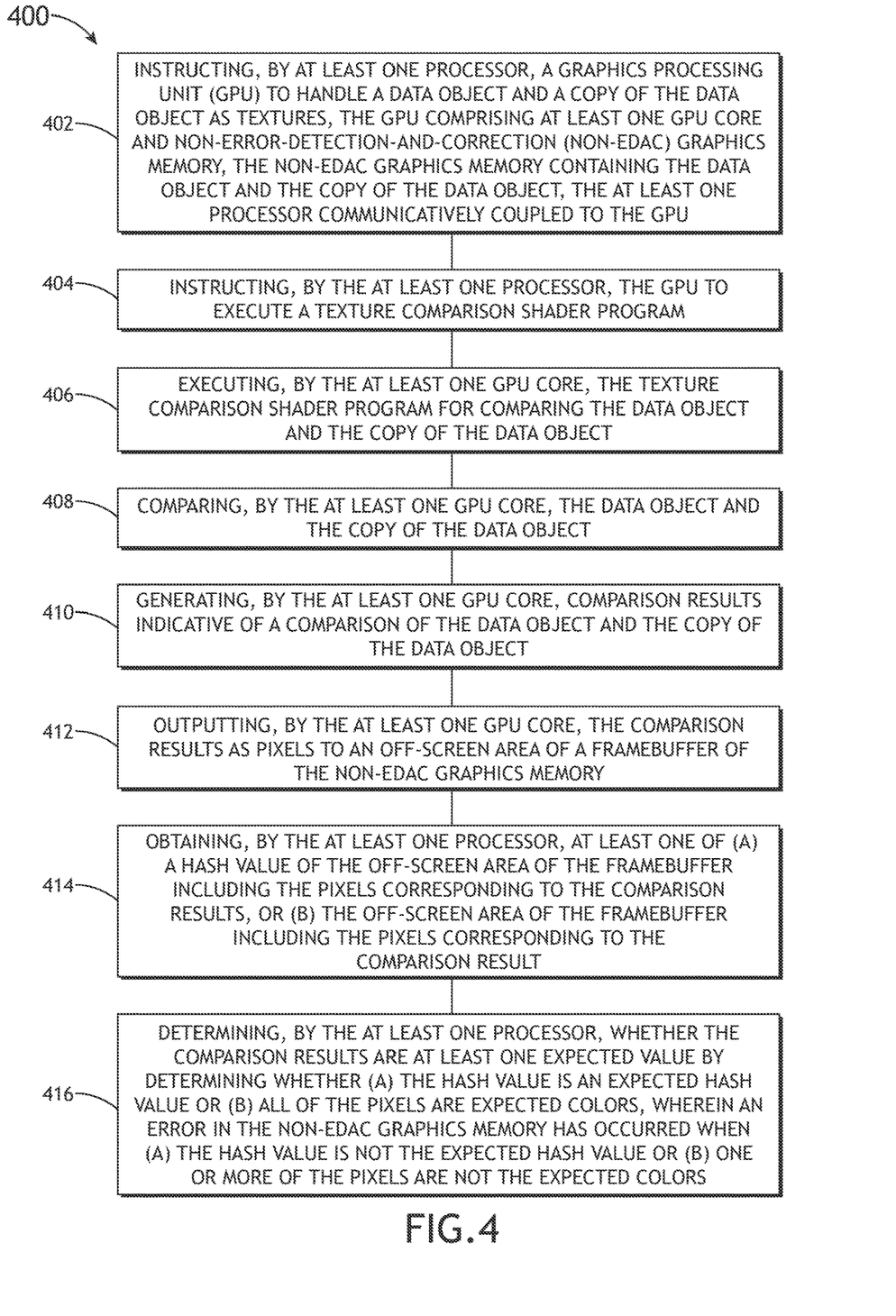
FIG. 4 is a diagram of an exemplary embodiment of a method according to the inventive concepts disclosed herein.

Referring now to FIG. 4, an exemplary embodiment of a method 400 according to the inventive concepts disclosed herein may include one or more of the following steps. Additionally, for example, some embodiments may include performing one or more instances of the method 400 iteratively, concurrently, and/or sequentially. Additionally, for example, at least some of the steps of the method 400 may be performed in parallel and/or concurrently. Additionally, in some embodiments, at least some of the steps of the method 400 may be performed non-sequentially.

A step 402 may include instructing, by at least one processor, a graphics processing unit (GPU) to handle a data object and a copy of the data object as textures, the GPU comprising at least one GPU core and non-error-detection-and-correction (non-EDAC) graphics memory, the non-EDAC graphics memory containing the data object and the copy of the data object, the at least one processor communicatively coupled to the GPU.

A step 404 may include instructing, by the at least one processor, the GPU to execute a texture comparison shader program.

A step 406 may include executing, by the at least one GPU core, the texture comparison shader program for comparing the data object and the copy of the data object.

A step 408 may include comparing, by the at least one GPU core, the data object and the copy of the data object.

A step 410 may include generating, by the at least one GPU core, comparison results indicative of a comparison of the data object and the copy of the data object.

A step 412 may include outputting, by the at least one GPU core, the comparison results as pixels to an off-screen area of a framebuffer of the non-EDAC graphics memory.

A step 414 may include obtaining, by the at least one processor, at least one of (a) a hash value of the off-screen area of the framebuffer including the pixels corresponding to the comparison results, or (b) the off-screen area of the framebuffer including the pixels corresponding to the comparison result.

A step 416 may include determining, by the at least one processor, whether the comparison results are at least one expected value by determining whether (a) the hash value is an expected hash value or (b) all of the pixels are expected colors, wherein an error in the non-EDAC graphics memory has occurred when (a) the hash value is not the expected hash value or (b) one or more of the pixels are not the expected colors.

Further, the method 400 may include any of the operations disclosed throughout.

As will be appreciated from the above, embodiments of the inventive concepts disclosed herein may be directed to a system and a method configured to determine whether an error in graphics memory of a GPU has occurred.

As used throughout and as would be appreciated by those skilled in the art, "at least one non-transitory computer-readable medium" may refer to as at least one non-transitory computer-readable medium (e.g., memory, graphics memory, and/or storage; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a graphics processing unit (GPU), the GPU comprising at least one GPU core and non-error-detection-and-correction (non-EDAC) graphics memory, the non-EDAC graphics memory containing a data object and a copy of the data object; and
    at least one processor communicatively coupled to the GPU, the at least one processor configured to:
        instruct the GPU to handle the data object and the copy of the data object as textures; and
        instruct the GPU to execute a texture comparison shader program;
    wherein the at least one GPU core is configured to:
        execute the texture comparison shader program for comparing the data object and the copy of the data object;
        compare the data object and the copy of the data object;
        generate comparison results indicative of a comparison of the data object and the copy of the data object; and
        output the comparison results as pixels to an off-screen area of a framebuffer of the non-EDAC graphics memory;
    wherein the at least one processor is further configured to:
        obtain at least one of (a) a hash value of the off-screen area of the framebuffer including the pixels corresponding to the comparison results, or (b) the off-screen area of the framebuffer including the pixels corresponding to the comparison results; and
        determine whether the comparison results are at least one expected value by determining whether (a) the hash value is an expected hash value or (b) all of the pixels are expected colors, wherein an error in the non-EDAC graphics memory has occurred when (a) the hash value is not the expected hash value or (b) one or more of the pixels are not the expected colors.

2. The system of claim 1, wherein the at least one processor is further configured to: upon a determination that the error in the non-EDAC graphics memory has occurred, latch a fault.

3. The system of claim 1, further comprising a video processor, wherein the at least one processor comprises a central processing unit (CPU).

4. The system of claim 3, wherein the GPU further comprises a display output communicatively coupled to the non-EDAC graphics memory,
    wherein the CPU is configured to:
        instruct the GPU to handle the data object and the copy of the data object as textures; and
        instruct the GPU to execute the texture comparison shader program;
    wherein the at least one GPU core is configured to:
        execute the texture comparison shader program for comparing the data object and the copy of the data object;
        compare the data object and the copy of the data object;
        generate the comparison results indicative of the comparison of the data object and the copy of the data object; and
        output the comparison results as the pixels to the off-screen area of the framebuffer of the non-EDAC graphics memory;
    wherein the display output is configured to output the framebuffer including the off-screen area of the framebuffer to the video processor;
    wherein the video processor is configured to:
        receive the framebuffer including the off-screen area of the framebuffer;
        compute the hash value of the off-screen area of the framebuffer; and
        output the hash value to the CPU;
    wherein the CPU is further configured to:
        obtain the hash value of the off-screen area of the framebuffer including the pixels corresponding to the comparison results; and
        determine whether the comparison results are the at least one expected value by determining whether the hash value is the expected hash value, wherein the error in the non-EDAC graphics memory has occurred when the hash value is not the expected hash value.

5. The system of claim 4, wherein the hash value is a cyclic redundancy check (CRC) value and the expected hash value is an expected CRC value.

6. The system of claim 5, wherein the display output is a cathode ray tube controller (CRTC).

7. The system of claim 1, wherein the at least one processor comprises a central processing unit (CPU).

8. The system of claim 7, wherein the CPU is further configured to:
   obtain the off-screen area of the framebuffer including the pixels corresponding to the comparison results; and
   determine whether the comparison results are the at least one expected value by determining whether all of the pixels are the expected colors, wherein the error in the non-EDAC graphics memory has occurred when one or more of the pixels are not the expected colors.

9. The system of claim 1, wherein execution of the texture comparison shader program causes repeated comparing of the data object and the copy of the data object.

10. The system of claim 9, wherein the at least one processor is further configured to:
   instruct the GPU to handle a second data object and a copy of the second data object as second textures; and
   instruct the GPU to execute the texture comparison shader program for comparing the second data object and the copy of the second data object,
   wherein execution of the texture comparison shader program causes repeated (a) comparing of the data object and the copy of the data object and (b) comparing of the second data object and the copy of the second data object.

11. The system of claim 1, wherein the data object is a graphics address remapping table (GART).

12. The system of claim 1, wherein the data object is texture data, vertex data, or another shader program.

13. The system of claim 1, wherein the data object is predetermined to be relatively more critical than other data contained in the non-EDAC graphics memory, wherein the at least one GPU core does not generate any comparison results corresponding to the other data.

14. The system of claim 1, wherein the system is a combined vision system, wherein at least one of the GPU and the at least one processor is configured to combine synthetic images of an environment and sensor images of the environment and output merged synthetic and sensor images of the environment to a display.

15. A method, comprising:
   instructing, by at least one processor, a graphics processing unit (GPU) to handle a data object and a copy of the data object as textures, the GPU comprising at least one GPU core and non-error-detection-and-correction (non-EDAC) graphics memory, the non-EDAC graphics memory containing the data object and the copy of the data object, the at least one processor communicatively coupled to the GPU;
   instructing, by the at least one processor, the GPU to execute a texture comparison shader program;
   executing, by the at least one GPU core, the texture comparison shader program for comparing the data object and the copy of the data object;
   comparing, by the at least one GPU core, the data object and the copy of the data object;
   generating, by the at least one GPU core, comparison results indicative of a comparison of the data object and the copy of the data object;
   outputting, by the at least one GPU core, the comparison results as pixels to an off-screen area of a framebuffer of the non-EDAC graphics memory;
   obtaining, by the at least one processor, at least one of (a) a hash value of the off-screen area of the framebuffer including the pixels corresponding to the comparison results, or (b) the off-screen area of the framebuffer including the pixels corresponding to the comparison results; and
   determining, by the at least one processor, whether the comparison results are at least one expected value by determining whether (a) the hash value is an expected hash value or (b) all of the pixels are expected colors, wherein an error in the non-EDAC graphics memory has occurred when (a) the hash value is not the expected hash value or (b) one or more of the pixels are not the expected colors.

* * * * *